United States Patent Office 3,301,653
Patented Jan. 31, 1967

3,301,653
COMPOSITION AND METHOD FOR
CONTROLLING CRABGRASS
Arthur W. Carlson, Crystal Lake, Ill., assignor to Velsicol
Chemical Corporation, Chicago, Ill., a corporation of
Illinois
No Drawing. Original application Aug. 1, 1963, Ser.
No. 299,145. Divided and this application Dec. 6,
1965, Ser. No. 523,811
2 Claims. (Cl. 71—2.3)

This is a division of application Serial No. 299,145, filed August 1, 1963.

This invention relates to the production of new pesticidal compositions of matter. More specifically, this invention relates to the new chemical compound having the molecular formula $C_{10}H_7Cl_5$, a melting point of about 100–102° C., and an infrared absorption spectrum, in carbon disulfide solution at a concentration of 30 mg./ml. at a cell length of 0.5 mm., with strong bands at 8.3, 9.25, 11.6, 12.03, and 13.72 microns, medium bands at 7.72, 7.9, 8.12, 8.40, 8.70, 8.85, 8.91, 9.50, 9.66, 9.82, 10.81, 11.30, and 13.4 microns, and weak bands at 3.46, 8.0, 10.01, 10.31, 11.0, 11.1, and 14.22 microns. Strong bands are defined as those at less than 30% transmission, medium bands are those at 30–50% transmission, and weak bands are those at more than 50% transmission without correction for solvent. The compound is highly soluble in carbon tetrachloride and benzene, moderately soluble in hexane and methanol, and insoluble in water. It has been found useful as a herbicide for the control of weeds such as crabgrass.

The new compound of this invention can be prepared from the gamma isomer of 4,5,6,7,8,8-hexachloro-3a,4,7,7a-tetrahydro-4,7-methanoindene. The latter known indene compound, which is obtained by the equimolecular Diels-Alder addition of hexachlorocyclopentadiene and cyclopentadiene and has a melting point of 210–211° C. (under nitrogen), can be isomerized in the presence of free-radical-initiating catalysts at temperatures below about 200° C. to give its gamma-isomer, M.P. 102–3° C., in addition to its beta-isomer, M.P. 146.3–147° C., and its alpha-isomer, M.P. 193–194.5° C., as well as other materials arising from the isomerization process. The gamam-isomer can also be obtained by heating the alpha-isomer at temperatures above about 200° C., or at lower temperatures if Lewis acid catalysts are employed. In this specification, the alpha- and gamma-isomers of 4,5,6,7,8,8-hexachloro - 3a4,7,7a-tetrahydro - 4,7-methanoindene will be referred to as alpha-A and gamma-A, respectively, for brevity.

The new compound of this invention can be prepared from gamma-A by selective dehalogenation to remove one atom of chlorine from the molecule of gamma-A. A preferred method for the preparation of the new compound of this invention comprises reacting gamma-A with a metal such as zinc dust in acid medium. The manner in which the intermediates and the new compound of this invention can be prepared is illustrated in the following examples. All temperatures are in degrees centigrade.

*Example 1.—Preparation of alpha-A and gamma-A from 4,5,6,7,8,8-hexachloro - 3a,4,7,7a-tetrahydro - 4,7-methanoindene*

4,5,6,7,8,8-hexachloro - 3a,4,7,7a-tetrahydro - 4,7-methanoindene (50 parts by weight) was dissolved in 195 parts by weight of carbon tetrachloride in a reaction vessel fitted with stirring apparatus, internal thermometer, and provision for reflux. A solution of 5 parts of benzoyl peroxide in 150 parts of carbon tetrachloride was then added at 80° over a period of 6 hrs. The reaction mixture was then stirred and refluxed for 4 hrs. and cooled. The solvent from about one liter of this reaction product was stripped for about 2 hrs. at 80–100° to give 34.7 g. of an oily residue, which was treated with 200 ml. of pentane. The precipitated solid was filtered off, recrystallized from acetone, and dried to give white crystals of alpha-A, M.P. 193–5°.

Analysis for $C_{10}H_6Cl_6$: Theory: C, 35.44%; H, 1.79%; Cl, 62.78%. Found: C, 35.89%; H, 1.75%; Cl, 62.10%.

The pentane filtrate remaining after removal of the alpha-A was concentrated to a small volume and passed through a column of 1500 g. of Florex XXS fuller's earth with pentane as the eluant. Sixteen 250-ml. fractions were taken. Removal of the solvent from fraction No. 7 of the Florex eluant gave an oily residue, which was redissolved in pentane and passed through a column of 80 parts by weight of silica gel, pentane again being used as the eluant. Four 100-ml. fractions were taken and found to contain the bulk of the unreacted indene-compound used as starting material. The silica gel column was then eluated with ether, and the solvent was removed from the eluants to give an oily residue. The oil was dissolved in pentane and passed through a column of 80 parts by weight of Florex XXS with pentane eluant. Fractions each 50-ml. in volume were taken. Fraction No. 4 was stripped to give an oily residue which solidified on standing. It was recrystallized from methanol to give white crystals of gamma-A, M.P. 97–8°.

Analysis for $C_{10}H_6Cl_6$: Theory: C, 35.44%; H, 1.79%; Cl, 62.78%. Found: C, 35.87%; H, 1.69%; Cl, 62.26%.

*Example 2.—Preparation of gamma-A from alpha-A*

Alpha-A (20.0 g.) having a melting point of 190–193° was placed in a 100-ml., tall-form beaker and heated on a hot plate to a temperature of 250°. The molten material was stirred and heated for 5 minutes at 250°, then for 5 minutes at 270°. An infrared scan of the product showed that only a small amount of alpha-A remained and that the conversion to gamma-A was nearly complete. A small amount of solid had sublimed on the sides of the beaker and was discarded. The solid remaining in the beaker after cooling was dissolved in a 75 ml. of hot hexane, and the solution was cooled to ice temperature. The precipitated solid was filtered, washed with 30 ml. of pentane, and dried to give 15.5 g. of essentially pure powdery gamma-A.

*Example 3.—Dechlorination of gamma-A*

Gamma-A (1000 g.) and 3 l. of glacial acetic acid were placed into a 5–l., 3-neck flask fitted with a stirrer, reflux condenser, thermometer, heating mantle, and provision for nitrogen sweep. The stirred solution was heated to 75°, and 200 g. of technical zinc powder was added during 2 min. The flask was swept with nitrogen periodically and whenever the system was opened to add more zinc. The mixture was stirred for 6 hrs., the temperature being maintained at 85–98°. A 100 g. portion of zinc was added after 2 hrs., and another 25 g. portion was added after 5.5 hrs. The hot reaction solution was decanted from the excess zinc into 3.2 l. of water. The zinc and the flask were washed with acetic acid, and the combined solution and washings were allowed to stand overnight. The precipitated solid was filtered, washed with water, and dried. The dried solid was taken up in 2 l. isopropanol at 70°, and the solution was cooled to 18° with occasional stirring during 2 hrs. The solid was filtered, washed with 1 l. of methanol, and dried to give 612 g. of product, M.P. 97–100°.

A portion of product from another similar run was recrystallized from heptane to give an analytical sample, M.P. 100–102°.

Analysis for $C_{10}H_7Cl_5$: Theory: C, 39.45%; H, 2.32%; Cl, 58.23. Found: C, 39.68%; H, 2.67%; Cl, 57.65%.

The toxicity of the compound of this invention to crabgrass can be shown by a variety of testing techniques known to the art. In one series of tests, filter paper was dipped in acetone solutions of the test compound at various concentrations. The paper was then dried, and small pieces were placed at the bottom of plastic dishes having a film of agar nutrient and a row of crabgrass seeds set apart from the treated paper. The seeds were allowed to germinate under controlled laboratory conditions, and the toxicity of the chemical compound was determined on the basis of the primary root length of the germinated seedlings, short root lengths being indicative of high toxicity to crabgrass. The results of these tests are shown in the following table:

|  | Average Root Length in mm. at Concentrations in p.p.m. of ||||||
|---|---|---|---|---|---|---|
|  | 500 | 400 | 300 | 200 | 100 | 50 |
| Compound of this Invention | 4 | 4 | 5 | 5 | 6 | 15 |
| Acetone Control | 29 | 29 | 29 | 29 | 29 | 29 |

For practical use as a herbicide, the compound of this invention is generally incorporated into herbicidal compositions which comprise an inert carrier and a herbicidally toxic amount of the compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions or emulsifiable concentrates.

A typical herbicidal composition according to this invention is illustrated by the following example, in which the quantities are in parts by weight.

*Example 4.—Preparation of a dust*

Product of Example 3 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicide of this invention can be applied in any manner recognized by the art. The concentration of the new compound of this invention in the herbicidal compositions will vary greatly with the type of formulation for the purpose for which it is designed, but generally the herbicidal compositions will comprise from about 0.05 to about 95 percent by weight of the active compound of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

The method of this invention for the control of crabgrass comprises contacting said crabgrass with a herbicidal composition comprising an inert carrier and as the essential active ingredient, in a quantity which is herbicidally toxic to said crabgrass, the compound of this invention. The exact amount of compound required will depend on a variety of factors, including the hardness of the particular crabgrass species, weather, method of application, the kind of beneficial plants in the same area, and the like. Thus, while the application of up to only about one or two ounces of an active compound per acre may be sufficient for good control of a light infestation of crabgrass growing under adverse conditions, the application of one pound or more of active compound per acre may be required for good control of a dense infestation of hardy species growing under favorable conditions.

I claim:

1. A herbicidal composition which comprises an inert carrier and a herbicidally toxic amount of the compound having the molecular formula $C_{10}H_7Cl_5$, a melting point of about 100–102° C., and an infrared absorption spectrum with strong bands at 8.3, 9.25, 11.6, 12.03, and 13.72 microns, medium bands at 7.72, 7.9, 8.12, 8.40, 8.70, 8.85, 8.91, 9.50, 9.66, 9.82, 10.81, 11.30, and 13.4 microns, and weak bands at 3.46, 8.0, 10.01, 10.31, 11.0, 11.1, and 14.22 microns.

2. The method for the control of crabgrass which comprises contacting said crabgrass with a herbicidal composition which comprises an inert carrier and as the essential active ingredient, in a quantity which is herbicidally toxic to said crabgrass, the compound having the molecular formula $C_{10}H_7Cl_5$, a melting point of about 100–102° C., and an infrared absorption spectrum with strong bands at 8.3, 9.25, 11.6, 12.03, and 13.72 microns, medium bands at 7.72, 7.9, 8.12, 8.40, 8.70, 8.85, 8.91, 9.50, 9.66, 9.82, 10.81, 11.30, and 13.4 microns and weak bands at 3.46, 8.0, 10.01, 10.31, 11.0, 11.1, and 14.22 microns.

References Cited by the Examiner

UNITED STATES PATENTS

| 3,000,973 | 9/1961 | Goldman et al. | 260—648 |
| 3,062,636 | 11/1962 | Regenstein | 71—2.3 |
| 3,121,003 | 2/1964 | Wilks et al. | 71—2.3 |

LEWIS GOTTS, *Primary Examiner.*

JAMES O. THOMAS, *Examiner.*